United States Patent  
Mutheevi

(10) Patent No.: US 12,395,546 B2  
(45) Date of Patent: Aug. 19, 2025

(54) BULK DISTRIBUTED UNIT (DU) RESTART PROCEDURE IN A FIFTH-GENERATION (5G) NETWORK

(71) Applicant: DISH Wireless L.L.C., Englewood, CO (US)

(72) Inventor: Neelima Mutheevi, Littleton, CO (US)

(73) Assignee: DISH Wireless L.L.C., Englewood, CO (US)

( * ) Notice: Subject to any disclaimer, the term of this patent is extended or adjusted under 35 U.S.C. 154(b) by 184 days.

(21) Appl. No.: 18/182,617

(22) Filed: Mar. 13, 2023

(65) Prior Publication Data

US 2024/0314194 A1    Sep. 19, 2024

(51) Int. Cl.
*H04L 67/025* (2022.01)
*G06F 11/14* (2006.01)

(52) U.S. Cl.
CPC ........ *H04L 67/025* (2013.01); *G06F 11/1438* (2013.01)

(58) Field of Classification Search
None
See application file for complete search history.

(56) References Cited

U.S. PATENT DOCUMENTS

2019/0364572 A1* 11/2019 Liao ..................... H04B 7/0691
2022/0174515 A1*  6/2022 Centonza ................ H04W 4/90

FOREIGN PATENT DOCUMENTS

CN       115622245 A   *  1/2023

OTHER PUBLICATIONS

Mutheevi, Neelima, "Radio unit (RU) upgrade procedure in a fifth-generation (5G) network," U.S. Appl. No. 18/182,653, filed Mar. 13, 2023 (62 pages).

* cited by examiner

*Primary Examiner* — Ario Etienne
*Assistant Examiner* — Mohammad Yousuf A. Mian
(74) *Attorney, Agent, or Firm* — Baker Botts L.L.P.

(57) ABSTRACT

A jump server receives a command to restart a set of distributed units (DUs) at one or more cell sites. In response, the jump server executes a wrapper script that logs in to a backend server, copies an input file that identifies the set of DUs to a user-specific directory at the backend server. The jump server also copies a bulk DU restart script to the user-specific directory at the backend server. The jump server initiates the execution of the bulk DU restart script at the backend server. The execution of the bulk DU restart script causes the backend server to restart the set of DUs, generate an output log file that comprises the results of the DU restart process, and store the output log file in the user-specific directory.

20 Claims, 7 Drawing Sheets

128

| SITE-NAME | DU-IP |
|---|---|
| SDLAS00001D | 10.154.164.73 |
| SDLAS00001D | 10.154.164.74 |
| SDLAS00001D | 10.154.164.74 |
| SDLAS00001D | 10.154.164.75 |
| SDLAS00001D | 10.154.164.76 |
| SDLAS00001D | 10.154.164.76 |
| SDLAS00001D | 10.154.164.77 |
| SDLAS00001D | 10.154.164.78 |
| SDLAS00001D | 10.154.164.78 |
| ... | |

| CLUSTER NAME | CLUSTER IP | SITEID/DU ID |
|---|---|---|
| cyswy002r-mvnr-p015 | 10.133.152.136 | sdlas00125c |
| cyswy002r-mvnr-p015 | 10.133.152.136 | sdlas00123b |
| cyswy002r-mvnr-p015 | 10.133.152.136 | 851010009 |
| cyswy002r-mvnr-p014 | 10.133.155.117 | sdlas00230a |
| cyswy002r-mvnr-p015 | 10.133.152.136 | 851013009 |
| cyswy002r-mvnr-p015 | 10.133.152.136 | sdlas00020b |
| cyswy002r-mvnr-p016 | 10.133.155.102 | sdlas00041b |
| cyswy002r-mvnr-p015 | 10.133.152.136 | sdlas00112b |
| cyswy002r-mvnr-p014 | 10.133.155.117 | sdlas00015b |
| cyswy002r-mvnr-p014 | 10.133.155.117 | sdlas00084b |
| cyswy002r-mvnr-p018 | 10.133.155.128 | nabna00045a |
| ... | | |

| SITE-NAME | DU-IP | PRE-RESTART DU STATUS | DU-CU CONNECTIVITY STATUS | DU RESTART STATUS | DU SERVICES STATUS | | POST-RESTART DU STATUS | | |
|---|---|---|---|---|---|---|---|---|---|
| | | | | | SERVICE 1 | ... | DU-CU CONNECTIVITY STATUS | SCROLLING PRACH | PRACH STATUS |
| SDLAS00001D | 10.154.164.73 | REACHABLE | NOT ESTABLISHED | SUCCESS | RUNNING | | ESTABLISHED | 9000 | OK |
| SDLAS00001D | 10.154.164.74 | REACHABLE | ESTABLISHED | SUCCESS | RUNNING | | ESTABLISHED | 9000 | OK |
| SDLAS00001D | 10.154.164.74 | REACHABLE | NOT ESTABLISHED | FAILURE | | | | | |
| SDLAS00001D | 10.154.164.75 | REACHABLE | ESTABLISHED | FAILURE | | | | | |

FIG. 2C

FIG. 4A
FIG. 4B

BULK DISTRIBUTED UNIT (DU) RESTART PROCEDURE IN A FIFTH-GENERATION (5G) NETWORK

TECHNICAL FIELD

The present disclosure relates generally to wireless communication, and more specifically to a bulk distributed unit (DU) restart procedure in a fifth-generation (5G) network.

BACKGROUND

A fifth generation (5G) base station or gNB is mainly split into three parts, namely Radio Unit (RU), Distributed Unit (DU), and Control Unit (CU). RU is the radio hardware entity that converts radio signals sent to and from the antenna into a digital signal for transmission over a packet network. The RU handles the digital front end (DFE) and the lower physical (PHY) layer. DU is a software entity that is deployed on-site on a server. DU software is normally deployed close to the RU on site and provides support for the lower layers of the protocol stack such as the radio link control (RLC), medium access control (MAC), and parts of the PHY layer. The CU provides support for the higher layers of the protocol stack such as the service data adaptation protocol (SDAP), packet data convergence protocol (PDCP), and radio resource control (RRC). Some DUs may need to be restarted due to DU-CU connectivity issues or may need to be reconfigured with an updated configuration. Some RUs may need to be upgraded with a target software instruction version. It is challenging to restart multiple DUs efficiency and/or upgrade multiple RUs without network coverage interruptions, among other drawbacks.

SUMMARY

The system described in the present disclosure provides several practical applications and technical advantages that overcome the current technical problems in wireless communication technology as described herein. The following disclosure is particularly integrated into a practical application of the operations of cellular cell sites, radio units (RUS), distributed units (DUs), and control units (CUs). The RUs may generally be referred to as antenna units at cellular towers. The DU may generally be referred to as a software entity that is deployed at a cell site on a server and provides support for the lower layers of the protocol stack such as the radio link control (RLC), medium access control (MAC), and parts of the lower physical layers. The CU may generally be referred to as a software entity deployed on a server and provides support for the higher layers of the protocol stack such as the service data adaptation protocol (SDAP), packet data convergence protocol (PDCP), and radio resource control (RRC).

Bulk DU Restart Procedure

The disclosed system contemplates an unconventional system and method for restarting multiple DUs at one or more cell sites. In some cases, DU-CU connectivity may be degraded, compromised, or otherwise not established due to software and/or hardware malfunctions. In some cases, a DU may need to be reconfigured with a new configuration setting. In such cases, the DU needs to be restarted to address the software and/or hardware malfunctions and/or to be reconfigured with the new configuration setting. The DUs are dispersed throughout a city to provide network coverage to network subscribers. At times, a large number of DUs (e.g., thousands of DUs) dispersed throughout the city may need to be restarted. One approach is to restart the DUs manually one at a time or DUs at one cell site at a time. However, this process is time-consuming and suffers from several drawbacks, including human error, inefficiency, network coverage degradation, and disruption. In addition, it is practically unfeasible to restart multiple DUs at multiple cell sites manually at the same or nearly at the same time. Since the DUs are responsible for providing network coverage, the restart process interrupts the network coverage by the DUs being restarted. Another approach to restart the DUs is to restart the DUs one by one. However, this approach is not practical for an area with many DUs.

The disclosed system is configured to provide a technical solution to these and other technical problems currently arising in the realm of wireless communication technology. For example, the disclosed system provides a method to restart multiple DUs at one or more cell sites with a single instruction command, e.g., provided by the bulk DU restart script. For example, a list of DUs that need to be restarted is provided to the bulk DU restart script and the script may trigger restarting the identified DUs at the same time or within a reasonably close time-frame. In this manner, the identified DUs are restarted more efficiently in less time and with less processing and network resources spent compared to the manual restart process. For example, with the manual restart process, multiple operators would have to use their computing devices to restart each DU. Thus, multiple computing devices would have to be used for restarting the DUs which leads to each computing device spending processing and network resources for each restart process. The disclosed system provides a method to reduce the processing and network resources to restart the DUs dispersed throughout the city.

Furthermore, by implementing the disclosed system, the underlying operations of the cell sites, DUs, and network coverage provided by the DUs are improved. For example, by detecting connectivity issues between a DU and a CU, and addressing the connectivity issue by restarting the DU, the connectivity issue may be addressed and resolved—which leads to reducing the network coverage interruptions. In another example, DUs with out-of-date configurations are identified and updated with a new configuration quicker compared to the current technology, which, in turn, further improves the data communication and network coverage provided by the DUs.

In certain embodiments, a system for restating DUs comprises a plurality of cell sites, a first server, and a second server. Each of the plurality of cell sites comprises at least one DU and a plurality of Control Units (CUs) communicatively coupled to the at least one DU. The first server comprises a first processor and is communicatively coupled to the plurality of cell sites. The second server is communicatively coupled to the first server. The second server comprises a second processor. The second processor is configured to receive an input file and a wrapper script. The input file comprises a set of identifiers associated with a set of DUs. The wrapper script comprises instructions related to deploying a DU restart script. The second processor is further configured to receive a command indicating to restart the set of DUs. In response to receiving the command, the second processor is further configured to execute the wrapper script causing the second processor to login to the first server using the credentials of a user. The second processor is further configured to copy the input file into a user-specific directory associated with the user at the first server. The second processor is further configured to copy the DU restart script from a shared memory location within the first server into the user-specific directory, wherein the DU restart script comprises instructions associated with restarting the set of DUs. The second processor is further configured to initiate execution of the DU restart script by the first processor, causing the first processor to determine that a first connection between a first DU from among the set of DUs and a CU is not established. The first processor is further configured to trigger restarting the first DU in response to determining that the first connection between the first DU and the CU is not established. The first processor is further configured to generate an output file that comprises the results of restarting the first DU.

RU Upgrade Procedure

The disclosed system contemplates an unconventional system and method for upgrading multiple RUs at one or more cell sites. For example, from time to time, RUs at one or more cell sites may need to be upgraded to a new or target software instruction/application version. In some cases, an upgrade procedure at an RU may fail due to multiple reasons, including files getting corrupted during the upgrade procedure, interruptions in network connectivity, and files being overwritten during the upgrade procedure, among others. Furthermore, the target software instruction version may only be applicable to certain radio frequency bands, and not work for RUs operating on other radio frequency bands. Therefore, the current approaches suffer from failed upgrades and/or selective upgrades for certain radio frequency bands.

The disclosed system is further configured to provide a technical solution to these and other technical problems currently arising in the realm of wireless communication technology. For example, the disclosed system provides a method to identify RUs to which the target software instruction version is applicable, and needs to be upgraded and trigger upgrading of the identified RUs by executing the RU upgrade script. For example, in this process, the disclosed system may determine whether a radio frequency band configuration associated with a RU corresponds to an applicable radio band that is associated with the target software instructions version. If it is determined that the radio frequency band configuration of the RU corresponds to the applicable radio band for the target software instruction version, the disclosed system may determine whether the target software instruction version is already present on an active memory partition. If it is determined that the target software instruction version is not present on the active memory partition, the disclosed system may determine if the target software instruction version is present on the passive memory partition. If it is determined that the target software instruction version is present on the passive memory partition, the disclosed system may switch the configuration of the memory partitions, so that the passive memory partition becomes active, and vice versa. The disclosed system may then reboot the RU. After the reboot, the target software instruction version is running on the active memory partition—which optimizes the operations of the RU.

If it is determined that the target software instruction version is not present on the passive memory partition, the disclosed system may determine if switching the configuration of the memory partitions is needed. If it is determined that switching the configuration of the memory partitions is needed, the disclosed system may switch the configuration of the memory partitions and reboot the RU, identify corrupted files, files associated with a previous version of the software instruction, etc., remove the identified files, download the target software instruction version, install the target software instruction version, and reboot the RU. Otherwise, if it is determined that switching the configuration of the memory partitions is not needed, the disclosed system may not have to switch the configuration of the memory partitions. The disclosed system may identify corrupted files, files associated with a previous version of the software instruction, etc., remove the identified files, download the target software instruction version, install the target software instruction version, and reboot the RU. After the reboot, the target software instruction version is running on the active memory partition—which optimizes the operations of the RU.

The disclosed system may further be configured to determine whether the RU and the target software instruction version are operating as expected. If it is determined that the RU and/or the target software instruction version are not operating as expected, the disclosed system may determine the root cause of the failure in the operation. If the root cause of the failure is software-related, the disclosed system may re-trigger the failed operation to address and/or resolve the issue. If the root cause of the failure is hardware-related, the disclosed system may communicate a message indicating that the hardware needs to be serviced. In this manner, failed and selective upgrades for RUs are minimized or prevented. This, in turn, provides a practical application for improving the operation of the RUs. For example, using the current approaches, some RUs are left not upgraded—which leads to reducing the quality or lack of data communication at the RUs, interruptions in the wireless communications, and coverage provided by the RU, among others.

The disclosed system improves the underlying operations of the RUs and network coverage and wireless communication provided by the RUs. For example, by detecting RUs in need of an upgrade, upgrading the identified RUs, identifying the root cause of failed upgrade (if any), and providing a solution to address the root cause of the failed upgrade (if any), the operation of the RUs is improved—which leads to improving the quality of data communication at the RUs and reducing the interruptions in the wireless communications at the RUs.

In certain embodiments, a system for upgrading RUs comprises a cell site, a first server, and a second server. The cell site comprises a plurality of RUs that are configured to convert radio signals into digital signals for data transmission over a network. The first server comprises a first processor and is communicatively coupled to the cell site. The second server comprises a second server and is communicatively coupled to the first server. The second processor is configured to receive an input file and a wrapper script. The input file comprises a set of identifiers associated with a set of RUs from among the plurality of RUs. The wrapper script comprises instructions associated with deploying a RU upgrade script. The second processor is further configured to receive a command indicating to upgrade the set of RUs according to a target software instruction version, wherein when the target software instruction version is executed by an RU from among the set of RUs, the RU performs one or more operations of the RU. In response to receiving the command, the second processor is further configured to execute the wrapper script causing the second processor to login to the first server using the credentials of a user. The second processor is further configured to copy the input file into a user-specific directory associated with the user at the first server. The second processor is further configured to copy the RU upgrade script from a shared memory location within the first server into the user-specific directory, wherein the RU upgrade script comprises instructions associated with upgrading the set of RUs. The second processor is further configured to execute the RU upgrade script causing the first processor to, for a first RU from among the set of RUs, determine that the target software instruction version is applicable to an operating radio signal frequency associated with the first RU. The first processor is further configured to determine that the target software instruction version is not present on an active memory storage partition, wherein the active memory storage partition is used for data transmission over the network. The first processor is further configured to determine whether the target software instruction version is present on a passive memory storage partition, wherein the passive memory storage partition is not in use for data transmission. In response to determining that the target software instruction version is present on the passive memory storage partition, the first processor is further configured to switch a configuration associated with the active memory storage partition from active to passive. The first processor is further configured to reboot the first RU.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 2A to 2C illustrate example input and out files related to a DU restart operation of the system of FIG. 1;

FIGS. 4A to 4B illustrate example input and out files related to an RU upgrade operation of the system of FIG. 1;

DETAILED DESCRIPTION

As described above, previous technologies fail to provide efficient and reliable solutions for implementing a bulk distributed unit (DU) restart procedure at one or more cell sites, and implementing a radio unit (RU) upgrade procedure at one or more cell sites. Embodiments of the present disclosure and its advantages may be understood by referring to FIGS. 1 through 7. FIGS. 1 through 7 are used to describe systems and methods for implementing a bulk DU restart procedure at one or more cell sites and implementing a RU upgrade procedure at one or more cell sites.

System Overview

Figure 1:
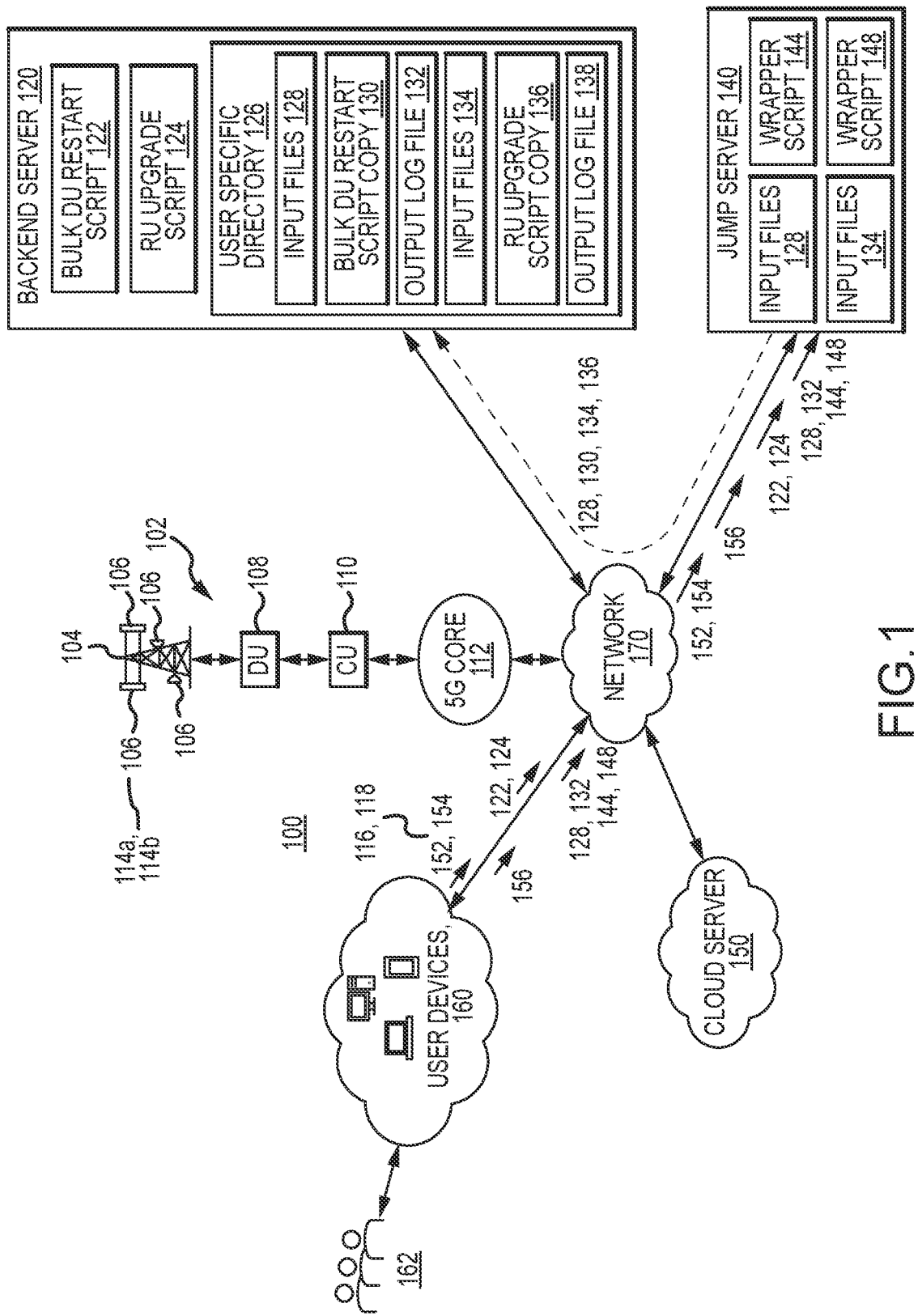
FIG. 1 illustrates an embodiment of a system configured to restart distributed units (DUs) and upgrade radio units (RUS)

FIG. 1 illustrates an embodiment of a cellular communication system 100 that is generally configured to i) implement a bulk distributed unit (DU) 106 restart procedure at one or more cell sites 102, and ii) implement a radio unit (RU) 106 upgrade procedure at one or more cell sites 102. In certain embodiments, the system 100 comprises a cell site 102, a backend server 120, a jump server 140, a cloud server 150, and user devices 160, each connected to a network 170. The cell site 102 may be part of a fifth generation (5G) base station (also referred to as gNB, eNB, eNode, etc.) and may include a base station tower 104 having one or more radio antennas 106 mounted thereon. In 5G terminology, the radio antennas 106 may be referred to as RUs. It may be noted that the terms "radio antennas 106" and "RUs 106" are used interchangeably in this disclosure. In 5G New radio (NR), RU 106 generally refers to a radio hardware entity that converts radio signals sent to and from the antenna into digital signals for data transmission over a packet network via network 170. The RU 106 handles the digital front end (DFE) and the lower physical (PHY) layer. The cell site 102 may further include a DU 108 communicatively coupled to the RUs 106. The DU 108 is generally a software entity that is deployed at the cell site 102 on a server and provides support for the lower layers of the protocol stack such as the radio link control (RLC), medium access control (MAC), and parts of the PHY layer. The DU 108 is configured to be connected to a control unit (CU) 110 wirelessly or by wires. The CU 110 may also be a software entity deployed on a server and provides support for the higher layers of the protocol stack such as the service data adaptation protocol (SDAP), packet data convergence protocol (PDCP), and radio resource control (RRC). The CU 110 connects to a 5G core 112 which provides access to the network 170. It may be noted that while system 100 illustrates one cell site 102, one DU 108, and one CU 110, system 100 may include a plurality of cell sites 102, a plurality of DUs 108, and a plurality of CUs 110. Each gNB may include one CU 110, but one CU 110 may control multiple DUs 108. Further, each DU 108 may support a plurality of cell sites 102. In certain embodiments, a cell site 102 may include six RUs 106 (or any other number of RUs 106) controlled by one DU 108. Network 170 enables communication between the components of the system 100.

Backend server 120 stores a bulk DU restart script 122 and a RU upgrade script 124 in a shared memory location. In certain embodiments, when the bulk DU restart script 122 is executed by a processor of the backend server 120, it causes the processor to perform one or more operations of the backend server 120 described herein with respect to restating one or more DUs 108. In certain embodiments, when the RU upgrade script 124 is executed by a processor of the backend server 120, it causes the processor to perform one or more operations of backend server 120 described herein with respect to upgrading one or more RUs 106.

Jump server 140 stores input files 128 and a wrapper script 144 for deploying the bulk DU restart script 122. The jump server 140 also stores input files 134 and a wrapper script 148 for deploying the RU upgrade script 124. The operations relating to executing the bulk DU restart script 122 are described in the discussion of FIGS. 1-3. The operations relating to executing RU upgrade script 124 are described in the discussion of FIGS. 1, 4, and 5. In other embodiments, system 100 may not have all of the components listed and/or may have other elements instead of, or in addition to, those listed above.

In general, the system 100 improves the operations of cell sites 102, RUs 106, DUs 108, and CUs 110. In some cases, a DU-CU connectivity may be degraded, compromised, or otherwise not established due to software and/or hardware malfunctions or issues. In some cases, a DU 108 may need to be reconfigured with a new configuration setting. In such cases, the DU 108 needs to be restarted to address the software and/or hardware malfunctions and/or to be reconfigured with the new configuration setting. The DUs 108 are dispersed throughout a city to provide network coverage to network subscribers. At times, a large number of DUs 108 (e.g., thousands of DUs 108) dispersed throughout the city may need to be restarted. One approach is to restart the DUs 108 manually one at a time or DUs 108 at one cell site 102 at a time. However, this process is time-consuming and suffers from several drawbacks, including human error, inefficiency, network coverage degradation and disruption. In addition, it is practically unfeasible to restart multiple DUs 108 at multiple cell sites 102 manually at the same or nearly at the same time. Since the DUs 108 are responsible for providing network coverage, the restart process interrupts the network coverage by the DUs 108 being restarted. Another approach to restart the DUs 108 is to restart the DUs 108 one by one. However, this approach is not practical for an area with many DUs 108.

The system 100 is configured to provide a technical solution to these and other technical problems currently arising in the realm of wireless communication technology. For example, the system 100 provides a method to restart multiple DUs 108 at one or more cell sites 102 with a single instruction command, e.g., provided by the bulk DU restart script 122. For example, a list of DUs 108 that need to be restarted are provided to the bulk DU restart script 122 and the bulk DU restart script 122 may trigger restarting the identified DUs 108 at the same time or within a reasonably close to real-time. In this manner, the identified DUs 108 are restarted more efficiently in less time and with less processing and network resources spent compared to the manual restart process. For example, with the manual restart process, multiple operators would have to use their computing devices to restart each DU 108. Thus, multiple computing devices would have to be used for restarting the DUs 108, which leads to each computing device spending processing and network resources for each restart process. The system 100 provides a method to reduce the processing and network resources to restart the DUs 108 dispersed throughout the city.

Furthermore, by implementing the system 100, the underlying operations of the cell sites 102, DUs 108, and the network coverage provided by the DUs 108 are improved. For example, by detecting connectivity issues between a DU 108 and a CU 110, and addressing the connectivity issue by restarting the DU 108, the connectivity issue may be resolved-which leads to reducing the network coverage interruptions. In another example, DUs 108 with out-of-date configuration are identified and updated with a new configuration quicker compared to the current technology, which, in turn, further improves the data communication and network coverage provided by the DUs.

Regarding the RU upgrade process, time to time, RUs 106 at one or more cell sites 102 may need to be upgraded to a new or target software instruction/application version. In some cases, an upgrade procedure at an RU 106 may fail due to multiple reasons, including files getting corrupted during the upgrade procedure, interruptions in network connectivity, files being overwritten during the upgrade procedure, among others. Furthermore, the target software instruction version may only be applicable to certain radio frequency bands. Thus, the target software instruction version would not work on other radio frequency bands. Therefore, the current approaches suffer from failed upgrades and/or selective upgrades for certain radio frequency bands.

The system 100 is further configured to provide a technical solution to these and other technical problems currently arising in the realm of wireless communication technology. For example, the system 100 provides a method to identify RUs 106 to which the target software instruction version is applicable to, and needs to be upgraded and trigger upgrading the identified RUs 106 by executing the RU upgrade script 124. For example, in this process, the system 100 may determine whether a radio frequency band configuration associated with a RU 106 corresponds to an applicable radio band that is associated with the target software instructions version. If it is determined that the radio frequency band configuration of the RU 106 corresponds to the applicable radio band for the target software instruction version, the system 100 may determine whether the target software instruction version is already present on an active memory partition. If it is determined that the target software instruction version is not present on the active memory partition, the system 100 may determine if the target software instruction version is present on the passive memory partition. If it is determined that the target software instruction version is present on the passive memory partition, the system 100 may switch the configuration of the memory partitions, so that the passive memory partition becomes active, and vice versa. The system 100 may then reboot the RU 106.

If it is determined that the target software instruction version is not present on the passive memory partition, the system 100 may determine if switching the configuration of the memory partitions is needed. If it is determined that switching the configuration of the memory partitions is needed, the system 100 may switch the configuration of the memory partitions and reboot the RU 106, identify corrupted files, files associated with a previous version of the software instruction, etc., remove the identified files, download the target software instruction version, install the target software instruction version, and reboot the RU 106. Otherwise, if it is determined that switching of the configuration of the memory partitions is not needed, the system 100 may not have to switch the configuration of the memory partitions. The system 100 may identify corrupted files, files associated with a previous version of the software instruction, etc., remove the identified files, download the target software instruction version, install the target software instruction version, and reboot the RU 106.

The system 100 may further be configured to determine whether the RU 106 and the target software instruction version are operating as expected. If it is determined that the RU 106 and/or the target software instruction version are not operating as expected, the system 100 may determine the root cause of the failure in the operation. If the root cause of the failure is software related, the system 100 may re-trigger the failed operation to address and/or resolve the issue. If the root cause of the failure is hardware-related, the system 100 may communicate a message indicating that the hardware needs a service. In this manner, failed and selective upgrades for RUs 106 are minimized or prevented. This, in turn, provides a practical application for improving the operation of the RUs 106. For example, using the current approaches, some RUs 106 are left not upgraded—which leads to reducing the quality or lack of the data communication at the RUs 106, interruptions in the wireless communications, and coverage provided by the RU 106, among others.

The system 100 improves the underlying operations of the RUs 106 and the network coverage and wireless communication provided by the RUs 106. For example, by detecting RUs 106 in need of an upgrade, upgrading the identified RUs 106, identifying the root cause of failed upgrade (if any), and providing a solution to address the root cause of the failed upgrade (if any), the operation of the RUs 106 is improved—which leads to improving the quality of data communication at the RUs 106 and reducing the interruptions in the wireless communications at the RUs 106.

System Components

Network

The network 170, in general, may be a wide area network (WAN), a personal area network (PAN), a cellular network, or any other technology that allows devices to communicate electronically with other devices. In one or more embodiments, the network 170 may be the Internet. Network 170 may be any suitable type of wireless and/or wired network. Network 170 may be a combination of one or more public and/or private networks, including a local area network (LAN), a metropolitan area network (MAN), a wide area network (WAN), and the like.

User Device

Each user device 160 may be operated by one or more users 162. Each user device 160 may be a computing device (e.g., desktop computer, laptop computer, tablet computer, smart phone, etc.) that can be operated by a user 162 and communicate with other devices connected to the network 170.

The user device 160 may include a hardware processor, memory, and/or circuitry (not explicitly shown) configured to perform any of the functions or actions of the user device 160 described herein. For example, a software application designed using software code may be stored in the memory and executed by the processor to perform the functions of the user device 160. The user device 160 is configured to communicate with other devices and components of the system 100 via the network 170.

Example Computing Device

In one or more embodiments, each of the backend server 120, jump server 140, RU 106, DU 108, CU 110, and user devices 160 may be implemented by a computing device running one or more software applications. For example, one or more of backend server 120, jump server 140, RU 106, DU 108, CU 110, and user devices 160 may be representative of a computing system hosting software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the backend server 120, jump server 140, RU 106, DU 108, CU 110, and user devices 160 may be representative of a server running one or more software applications to implement respective functionality as described below. In certain embodiments, one or more of the backend server 120, jump server 140, RU 106, DU 108, CU 110, and user devices 160 may run a thin client software application where the processing is directed by the thin client but largely performed by a central entity such as a server (not shown).

Backend server 120 and jump server 140 may be part of a computing infrastructure of an organization. In this context, the network 170 may include a private network (e.g., local area network (LAN), wide area network (WAN), etc.) to which computing nodes of the organization may be connected. The private network of the organization may be connected to the internet, which also may be part of the network 170. The jump server 140 may provide users 162 of the organization access to several components (e.g., backend server 120, other servers, printers, etc.) of the computing infrastructure that perform several different functions. In other words, the jump server 140 may act as a portal that provides users 162 access to all other systems and services of the organization's computing infrastructure. Backend server 120 may be configured to check and determine the performance of entities in the 5G infrastructure, including RUs 106 and DUs 108. For example, the backend server 120 may be communicatively coupled (e.g., via network 170 or directly) to a plurality of cell sites 102 and may be configured to run bulk DU restart and/or RU upgrade on several entities at one or more cell sites 102 including one or more RUs 106 and one or more DUs 108, respectively. In one embodiment, users 162 may use their user devices 160 to login to the jump server 140. Once logged into the jump server 140, a user 162 may access other systems and services (e.g., backend server 120) of the organization's computing infrastructure.

Bulk DU Restart Procedure Operational Flow

Some embodiments of the present disclosure provide unique techniques for restarting DUs 108 and determining whether the restart process was successful. Some embodiments provide a solution if a restart process of one or more DUs 108 was not successful. For example, if a restart process of a DU 108 was not successful, some embodiments trigger a report message that indicates the DU 108 restart process was not successful to be sent to one or more entities (e.g., the backend server 120, jump server 140, the user devices 160, a device associated with an organization that provided the DU 108, etc.) Therefore, some embodiments described herein provide a solution to address (and resolve) DU-CU connectivity issues (e.g., degraded or lack of communication) and to provide a bulk DU restart at one or more cell sites 102 with a single command/instruction (e.g., the bulk DU restart script 122) at a prescribed timestamp or timespan.

In operation, the operational flow for the bulk DU restart procedure may begin when a user 162 provides an input file 128 that includes a list of identifiers of the DUs 108 to be restarted. An example of the input file 128 is illustrated in FIG. 2A. For example, the input file 128 may include server/cluster names, server/cluster Internet Protocols (IPs), and cell site Identification (ID) associated with the DUs 108. Referring to FIG. 2A, an input file 128 in the form of a table is presented. Each row of the table includes a name of a cell site 102 (shown as Site-Name) and an IP address of an RU 106 (shown as RU-IP) installed at the cell site 102. When the user 162 desires to restart one or more DUs 108, an input file 128 may specify an identity of each DU 108 that is to be restarted and, for each DU 108, an identity of the server that implements and/or hosts the DU 108. It may be noted that a server may implement multiple DUs 108 and may be called a cluster.

FIG. 2B illustrates another example of the input file 128 in the form of a table. As shown in FIG. 2B, each row of the table identifies a DU 108 (shown as Site ID/DU ID), a cluster name of the server that implements the DU 108 and an IP address of the cluster/server (shown as Cluster IP). It may be noted that since each cell site 102 generally has a single DU 108, the Site ID associated with a cell site 102 may identify the DU 108 operating that the cell site 102.

Referring back to FIG. 1, a wrapper script 144 may be a software program and be executed by a processor of the jump server 140 and is generally configured to deploy the bulk DU restart procedure at the DUs 108 identified in the input file 128. The wrapper script 144 may include software instructions related to deploying the bulk DU restart script 122.

The user 162 may communicate the input file 128 and the wrapper script 144 to the jump server 140 via the user device 160 and network 170. The wrapper script 144 and input files 128 may initially be stored at a user device 160 of the user 162 desiring to restart certain DUs 108. For example, the user 162 may generate the input files 128 (e.g., as shown in FIGS. 2A and 2B) using user device 160 by entering information identifying the DUs 108 the user 162 desires to restart. In one embodiment, once generated, the user 162 may upload the input files 128 to a cloud server 150. Additionally, or alternatively, the wrapper script 144 may also be stored at the cloud server 150. In this context, when the user 162 is ready to trigger the restart process of the DUs 108, the user 162 may download the input files 128 and the wrapper script 144 from the cloud server 150 on to the user device 160 of the user 162.

As part of restarting the DUs 108, the user 162 may first login to the jump server 140. As described above, the jump server 140 may act as a portal that provides users 162 access to all other systems and services of an organization's computing infrastructure. In one embodiment, the user 162 may need authentication credentials to log into the jump server 140. For example, the jump server 140 may require multi-factor authentication for logins to the jump server 140. Once logged into the jump server 140, the user 162 may copy the input files 128 and the wrapper script 144 to the jump server 140. Once the input files 128 and wrapper script 144 are stored at the jump server 140, the jump server 140 may be configured to initiate the bulk restart process for the DUs 108 identified in the input files 128 by executing the wrapper script 144. In one embodiment, after the input files 128 and wrapper script 144 are stored at the jump server 140, the jump server 140 may receive a command 152 (e.g., from the user 162) to restart the identified DUs 108 identified in the input files 128. The jump server 140 may execute the wrapper script 144 in response to receiving the command 152.

Execution of the wrapper script 144 may cause the jump server 140 to perform a number of tasks in relation to the restart process of the DUs 108 identified in the input files 128. The wrapper script 144 causes the jump server 140 to log into the backend server 120. As described above, backend server 120 may be configured to restart entities in the 5G infrastructure including DUs 108. In one embodiment, the wrapper script 144 may use the authentication credentials of the user 162 requesting the DU restart process to login to the backend server 120. For example, only certain users 162 of the organization may be authorized to access the backend server 120 and request restarting the DUs 108. The wrapper script 144 may check the user authorization of the user 162 requesting the restart process and log into the backend server 120 if the user is authorized to request the restart process. In one embodiment, each user 162 authorized to access the backend server 120 may have a user-specific memory space assigned on the backend server 120. A user 162 may use the user-specific memory space to store files related to the DU restart process. For example, the user-specific memory space assigned to the user 162 may store a user-specific directory 126 that the user 162 may use to store files related to the DU restart process.

After logging into the backend server 120, wrapper script 144 copies the input files 128 from the jump server 140 to the user-specific directory 126 on the backend server 120, wherein the user-specific directory 126 belongs to the user 162 that requested the DU restart process. Additionally, wrapper script 144 may copy a bulk DU restart script 122 (shown as bulk DU restart script copy 130) from a shared location on the backend server 120 to the user-specific directory 126.

The bulk DU restart script 122 may be stored in a shared memory location in a memory storage associated with the backend server 120. For example, the bulk DU restart script 122 may be provided by the user 162 and/or any other operator via a user device 160. The bulk DU restart script 122 is a software program that runs one or more DU restart commands or procedures in relation to the DUs 108 identified in the input files 128. Each restart command or procedure may perform a different operation related to restarting the DUs 108, such as pre-restart DU status check, DU-CU connectivity status, DU restart status, DU service status checks, and post-restart DU status. These operations are described in conjunction with the output log file 132 (see FIG. 2C).

The bulk DU restart script 122 stored at the shared location on the backend server 120 may be a master copy of the bulk DU restart script 122 that can only be updated by authorized users 162. Updates can be made to the master copy of the bulk DU restart script 122 only by users 162 authorized to update the bulk DU restart script 122. Every time a user 162 requests to run a restart process in relation to one or more DUs 108, the wrapper script 144 copies the master copy of the bulk DU restart script 122 (e.g., a read-only copy) into a user-specific directory 126 and executes the bulk DU restart script copy 130 to perform the requested restart process. This helps ensure that the most recent and updated version of the bulk DU restart script 122 is used for every restart process.

After the input files 128 and the bulk DU restart script copy 130 have been copied to the user-specific directory 126 on the backend server 120, wrapper script 144 initiates execution of the bulk DU restart script copy 130 at the backend server 120. The execution of the bulk DU restart script copy 130 causes the backend server 120 to run a set of DU restart procedures on the one or more DUs identified in the input files 128. For example, the bulk DU restart script copy 130 may read identities of the one or more DUs 108 from the input files 128 and may run the restart procedures on the identified one or more DUs 108. Bulk DU restart script copy 130 may cause the backend server 120 to generate an output log file 132 that includes results of running the set of restart procedures on the one or more DUs 108. The bulk DU restart script copy 130 may then cause the backend server 120 to store the generated output log file 132 in the user-specific directory 126 of the requesting user 162.

Referring to FIG. 2C, an example output log file 132 is illustrated in a table format. Each row in the table refers to a restart process of a different DU 108. As shown in the FIG. 2C, the table includes columns for statues at different stages of the DU restart process. For example, in the "pre-restart DU status" column, it is indicated whether a DU 108 is reachable or not—meaning whether a connection to the DU 108 is established or not before the restart process. If the DU 108 cannot be reached, the restart process of the DU 108 may fail. The "site-name" and "RU IP" columns may be taken from the input file 128. Alternatively, the columns from the input file 128 that includes cluster name, cluster IP, and site ID/DU ID may be included in the output log file 132.

In the "DU-CU connectivity status" column, it is indicated whether a DU 108 is connected to a respective CU 110. For example, in the first and third rows, the DU 108 is not connected to a respective CU 110, in the second and fourth rows, the DU 108 is connected to a respective CU 110. In some examples, if the DU-CU connectivity status column shows that a DU 108 is not connected to a CU 110, it is determined that the DU 108 may need to be restarted to re-establish the connection of DU 108 with the CU 110. In other examples, if a DU 108 is desired to be restarted to be reconfigured according to a configuration file, the DU 108 may be restarted regardless of the indication in the DU-CU connectivity status column.

In the "DU restart status" column, the status of restart status of the DU 108 is provided—indicating whether the restart process was successful or not. In the example of FIG. 2C, the first and second rows show that the DUs 108 are restarted successfully, and the third and fourth rows show that the DUs 108 are not restarted successfully.

In the "DU service status" column, the status of each service provided by the DU 108 after the restart process is provided. In the first and second rows, service 1 provided by the DUs 108 is running as expected, in the third and fourth rows, service 1 provided by the DUs 108 is not running as expected (indicated by an empty table block). The status of other services of the DUs 108 may also be included in the output log file 132.

In the "post-restart DU status" column, the status of the DUs 108 after the restart process is indicated. For example, the DU-CU connectivity status, scrolling Physical Random-Access Channel (PRACH), and PRACH status are included in this column. The DU-CU connectivity status after the restart indicates if the connection between DU 108 and respective CU 110 is established. If the connection between DU 108 and respective CU 110 is not established, the table box may be empty, such as the third and fourth rows. Otherwise, the table box may indicate that the connection is established. The "scrolling PRACH" column may indicate whether the DU 108 is scrolling PRACH channels as expected according to a preconfigured value, e.g., 9000, etc., or if the DU 108 is not scrolling PRACH channels as expected—in which case, the respective table box may be empty. The "PRACH status" column may indicate whether the data communication associated with the PRACH channels is as expected. Otherwise, the respective table box for the PRACH status may be empty, such as the third and fourth rows.

Referring back to FIG. 1, once the execution of the bulk DU restart script copy 130 is completed by the backend server 120 and the output log file 132 has been generated and stored in the user-specific directory 126, the wrapper script 144 running at the jump server 140 takes over and copies the output log file 132 to the jump server 140. After copying the output log file 132 to the jump server 140, the wrapper script 144 deletes the input files 128, bulk DU restart script copy 130 and output log file 132 from the user-specific directory 126. As several users 162 may run the DU restart procedure and may store files related to the restart process in respective user-specific directories of the users on the backend server 120, continuing to store files related to running the restart process after the restart processes are completed may unnecessarily occupy memory at the backend server 120. Deleting files related to the restart process after the restart process is completed, clears up memory space at the backend server 120. Additionally, as described above, when a DU restart procedure is requested by a user 162, the wrapper script 144 copies the most recent version of the bulk DU restart script 122 from the shared location at the backend server 120 to the user-specific directory 126. Thus, there is no need to store a previous version of the bulk DU restart script (e.g., bulk DU restart script copy 130) after the requested restart procedure has been completed.

Once the output log file 132 has been copied to the jump server 140, the user 162 may copy the output log file 132 from the jump server 140 to the user device 160 of the user 162. Thereafter, the user 162 may delete the input files 128 and wrapper script 144 from the jump server 140. This helps clean up memory space on the jump server 140 for use by other operations performed by the jump server 140. In one embodiment, after the output log file 132 has been copied to the jump server 140, the jump server 140 may transmit the output log file 132 to the user device 160 and then delete the output log file 132 and the input files 128 from the jump server 140 to clear up memory space at the jump server 140. In one embodiment, the output log file 132 may be generated in a comma-separated values (CSV) file format.

In certain embodiments, the restart procedures may be run simultaneously on one or more DUs 108. Thus, multiple DUs 108 may be restarted at the same time or substantially simultaneously within a threshold time span (e.g., within two seconds, and the like).

Deploying the Bulk DU Restart Script

In certain embodiments, the jump server 140 may receive the input file 128 and the wrapper script 144, e.g., from the user 162 or the cloud server 150 via the network 170. The wrapper script 144 may include instructions related to deploying the bulk DU restart script 122. The jump server 140 may also receive a command 152 that indicates to start a set of DUs 108 identified in the input file 128. In response, the jump server 140 may execute the wrapper script 144 that causes the jump server 140 to login to the backend server 120 using credentials of the user 162.

The jump server 140 and/or the backend server 120 may copy the input files 128 into the user-specific directory 126 that is associated with the user 162. The jump server 140 and/or the backend server 120 may copy the bulk DU restart script 122 from the shared memory location at the backend server 120 into the user-specific directory 126 specified by the user 162 in the command 152. In other words, the jump server 140 and/or the backend server 120 may copy the latest version of the bulk DU restart script 122 (e.g., the bulk DU restart script copy 130) in the user-specific directory 126. The bulk DU restart script 122 may be stored in the shared memory location at the backend server 120 by an authorized user 162. The bulk DU restart script 122 may include software instructions associated with restarting the set of DUs 108 identified in the input file 128.

Executing the Bulk DU Restart Script

The jump server 140 may execute or initiate the execution of the bulk DU restart script copy 130 from the user-specific directory 126 by the processor of the backend server 120. This process may cause the backend server 120 to start the restart process of the set of DUs 108. The backend server 120 may perform a series of pre-restart status checks for the DU 108 and DU-CU connectivity. For example, the backend server 120 determines the pre-restart DU status associated with each DU 108 indicated in the input file 128. In this example, the backend server 120 may determine if a DU 108 is reachable or not, similar to that described in the discussion of FIG. 2C. In another example, the backend server 120 may determine a DU-CU connectivity status for each DU 108. In this example, the backend server 120 may determine if a DU 108 is connected to a respective CU 110. For example, the DU 108 may be sent an acknowledgment request message periodically (e.g., every five, ten, fifteen minutes, etc.), e.g., by the CU 110. If the DU 108 does not communicate an acknowledgment response message to the CU 110, it may be determined that the DU 108 is not connected to the CU 110, similar to that described in the discussion of FIG. 2C. For example, assume that the backend server 120 determines that a first connection between a first DU 108 from among the set of DUs 108 identified in the input file 128 and the respective CU 110 is not established. In response, the backend server 120 may trigger restarting the first DU 108.

The backend server 120 may generate the output log file 132 (see FIG. 2C) which includes the results of restarting the first DU 108 and other DUs 108 identified in the input file 128. For example, the result of restating the first DU 108 may indicate that the first DU 108 is connected to the respective CU 110. In another example, the result of restating the first DU 108 may indicate that the first DU 108 is not connected to the respective CU 110. In another example, the result of restating the first DU 108 may indicate whether the restart process failed or not. In another example, the result of restating the first DU 108 may indicate if the first DU 108 is scrolling PRACH channels according to a preconfigured PRACH scrolling value, similar to that described in the discussion of FIG. 2C.

The backend server 120 may perform a series of post-restart status checks for the DU 108 and DU-CU connectivity, DU services, scrolling PRACH, and PRACH status, similar to that described in the discussion of FIG. 2C. In another example, assume that the backend server 120 determines that a second connection between a second DU 108 from among the set of DUs 108 identified in the input file 128 and the respective CU 110 is established and that the backend server 120 receives an input DU configuration file 156 associated with the second DU 108, e.g., from the user 162 via the network 170. In response, the backend server 120 may determine that the second DU 108 needs to be reconfigured according to the input configuration file 156.

The backend server 120 may trigger restarting of the second DU 108. The backend server 120 may include the results of restarting the second DU 108 in the output log file 132. For example, the result of restarting the second DU 108 may indicate that the second DU 108 is connected to the respective CU 110. In another example, the result of restating the second DU 108 may indicate that the second DU 108 is not connected to the respective CU 110. In another example, the result of restating the second DU 108 may indicate whether the restart process failed or not. In another example, the result of restating the second DU 108 may indicate if the second DU 108 is scrolling PRACH channels according to a preconfigured PRACH scrolling value, similar to that described in the discussion of FIG. 2C.

In certain embodiments, the backend server 120 may determine a DU restart status for each DU 108 identified in the input file 128, where the DU restart status may indicate whether the DU 108 was restarted or not, similar to that described in the discussion of FIG. 2C.

In certain embodiments, the backend server 120 may determine whether a service associated with a DU 108 has failed to restart after restarting the DU 108. If it is determined that a service associated with the DU 108 has failed to restart after restarting the DU 108, the backend server 120 (e.g., via the bulk DU restart script copy 130) may include an indication in the output log file 132 that the service of the DU 108 has failed to restart, similar to that described in the discussion of FIG. 2C. If it is determined that a service associated with a DU 108 has successfully restarted after restarting the DU 108, the backend server 120 (e.g., via the bulk DU restart script copy 130) may include an indication in the output log file 132 that the service of the DU 108 restarted successfully, similar to that described in the discussion of FIG. 2C.

Method for Bulk DU Restart Procedure

Figure 3:
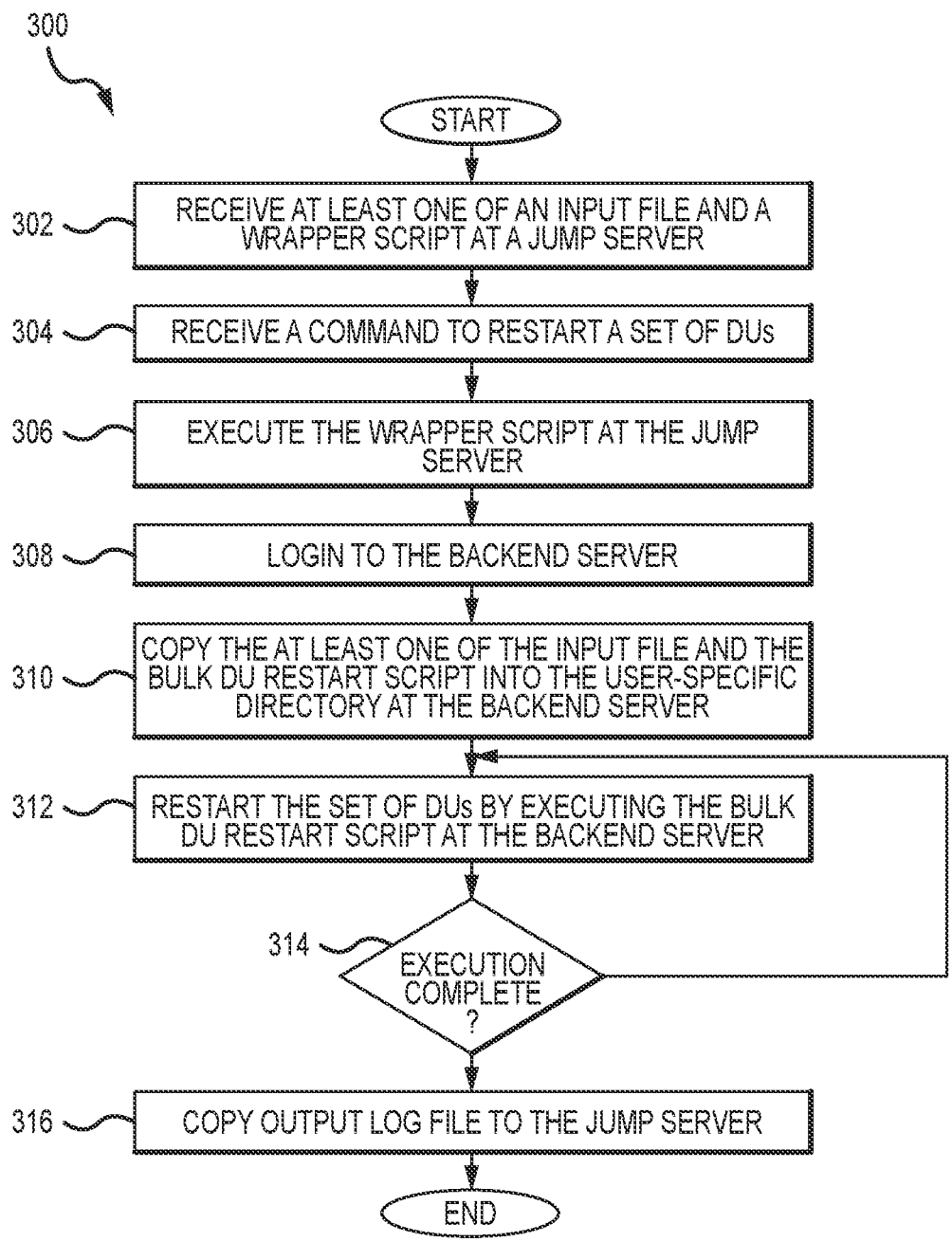
FIG. 3 illustrates an example flowchart of a method for restating DUs.

FIG. 3 illustrates an example flowchart of a method 300 for the bulk DU restart procedure according to certain embodiments of the present disclosure. Modifications, additions, or omissions may be made to method 300. Method 300 may include more, fewer, or other operations. For example, operations may be performed in parallel or in any suitable order. While at times discussed as the system 100, jump server 140, backend server 120, or components of any of thereof performing operations, any suitable system or components of the system may perform one or more operations of the method 300. For example, one or more operations of method 300 may be implemented, at least in part, in the form of software instructions (e.g., wrapper script 144, bulk DU restart script 122, bulk RU restart script copy 130, etc.), stored on non-transitory, tangible, machine-readable media (e.g., memory 606 and 706 of FIGS. 6 and 7, respectively) that when run by one or more processors (e.g., processor 602 and 702 of FIGS. 6 and 7, respectively) may cause the one or more processors to perform operations 302-316.

At operation 302, the jump server 140 receives at least one of input file 128 and the wrapper script 144. For example, the jump server 140 may receive the input file 128 and/or the wrapper script 144 from the user device 160 and/or the cloud server 150, similar to that described in FIGS. 1-2. The input file 128 may include a list of a set of DUs 108 that are desired to be restarted.

At operation 304, the jump server 140 receives a command 152 to restart the set of DUs 108. For example, the jump server 140 may receive the command 152 from the user device 160, similar to that described in FIG. 1. At operation 306, the jump server 140 executes the wrapper script 144.

At operation 308, the jump server 140 logs into the backend server 120. For example, the jump server 140 may use the user credentials associated with the 162 to log into the backend server 120, similar to that described in FIG. 1.

At operation 310, the jump server 140 copies at least one of the input file 128 and the wrapper script 144 into the user-specific directory 126 at the backend server 120.

At operation 312, the jump server 140 and/or the backend server 120 restart the set of DUs 108 by executing the bulk DU restart script copy 130. At operation 314, the jump server 140 and/or the backend server 120 determine whether the execution of the bulk DU restart script copy 130 is completed. In this process, the jump server 140 and/or the backend server 120 may determine whether each DU 108 indicated in the input file 128 is restarted. In other words, the jump server 140 and/or the backend server 120 may determine whether each DU restart process failed or succeeded. If it is determined that the execution of the bulk DU restart script copy 130 is completed, method 300 proceeds to operation 314. Otherwise, method 300 may return to operation 312. In certain embodiments, if it is determined that the execution of the bulk DU restart script copy 130 is not completed, method 300 may wait until all the DUs 108 (indicated in the input file 128) are restarted or at least an indication of a failed DU restart is detected and/or added to the output log file 132. At the end of this operation, the output log file 132 is generated and populated with the DU restart procedure.

At operation 316, the backend server 120 copies the output log file 132 to the jump server 140. Once the output log file 132 has been copied to the jump server 140, the user 162 may copy the output log file 132 from the jump server 140 to the user device 160 of the user 162. Thereafter, the user 162 may delete the input files 128 and wrapper script 144 from the jump server 140. This helps clean up memory space on the jump server 140 for use by other operations performed by the jump server 140.

RU Upgrade Operational Flow

Referring back to FIG. 1, some embodiments of the present disclosure provide unique techniques for upgrading RUs 106 and determining whether the upgrade process was successful. Some embodiments provide a solution if the upgrade process of RU(s) 106 was not successful. For example, if an upgrade process of a RU 106 was not successful, some embodiments trigger a report message that indicates the upgrade process of the RU 106 was not successful to be sent to one or more entities (e.g., the backend server 120, jump server 140, the user devices 160, a device associated with an organization that provided the RU 106, etc.). Some embodiments provide a solution to detect if a target software instruction version is not compatible or applicable to a radio frequency band associated with an RU 106. Therefore, some embodiments described herein provide a solution to address (and resolve) failed and selective RU upgrades.

In operation, an example operational flow for the RU upgrade procedure may begin when a user 162 provides an input file 134 that includes a list of identifiers of the RUs 106 to be upgraded. An example of the input file 134 is illustrated in FIG. 4A. For example, the input file 134 may include servers/cluster names, server/cluster IPs, and cell site IDs associated with the RUs 106.

Referring to FIG. 4A, an input file 134 in form of a table is presented. Each row of the table includes a name or identifier of a cell site 102 (shown as Site ID) and an IP address of an RU 106 (shown as RU-IP) installed at the cell site 102. When the user 162 desires to upgrade one or more RUs 106, an input file 134 may specify the identity of each RU 106 that is to be restarted and, for each RU 106, the identity of the server that implements and/or hosts the RU 106. It may be noted that a server may implement multiple RUs 106 and may be called a cluster.

Referring back to FIG. 1, a wrapper script 148 may be a software program and be executed by a processor of the jump server 140 and is generally configured to deploy the RU upgrade procedure (e.g., the RU upgrade script 124) at the RUs 106 identified in the input files 134. The wrapper script 148 may include software instructions related to deploying the RU upgrade script 124.

The user 162 may communicate the input file 134 and the wrapper script 148 to the jump server 140 via the user device 160 and network 170. The wrapper script 148 and input files 134 may initially be stored at a user device 160 of the user 162 desiring to upgrade certain RUs 106. For example, the user 162 may generate the input files 134 (e.g., as shown in FIG. 4A) using user device 160 by entering information identifying the RUs 106 the user 162 desires to upgrade. In one embodiment, once generated, the user 162 may upload the input files 134 to the cloud server 150. Additionally, or alternatively, the wrapper script 148 may also be stored at the cloud server 150. In this context, when the user 162 is ready to trigger the upgrade process of the RUs 106, the user 162 may download the input files 134 and the wrapper script 148 from the cloud server 150 on to the user device 160 of the user 162.

As part of upgrading the RUs 106, the user 162 may first login to the jump server 140, similar to that described above.

In one embodiment, the user 162 may need authentication credentials to log into the jump server 140. For example, the jump server 140 may require multi-factor authentication for logins to the jump server 140. Once logged into the jump server 140, the user 162 may copy the input files 134 and the wrapper script 148 to the jump server 140. Once the input files 134 and the wrapper script 148 are stored at the jump server 140, the jump server 140 may be configured to initiate the bulk upgrade process for the RUs 106 identified in the input files 134 by executing the wrapper script 148. In one embodiment, after the input files 134 and wrapper script 148 are stored at the jump server 140, the jump server 140 may receive a command 154 (e.g., from the user 162) to upgrade the identified RUs 106 identified in the input files 134. The jump server 140 may execute the wrapper script 148 in response to receiving the command 154.

Execution of the wrapper script 148 may cause the jump server 140 to perform a number of tasks in relation to the upgrade process of the RUs 106 identified in the input files 134. The wrapper script 148 causes the jump server 140 to log into the backend server 120. As described above, backend server 120 may be configured to upgrade certain entities in the 5G infrastructure including RUs 106. In one embodiment, the wrapper script 148 may use the authentication credentials of the user 162 requesting the RU upgrade process to login to the backend server 120. For example, only certain users 162 of the organization may be authorized to access the backend server 120 and request upgrading the RUs 106. The wrapper script 148 may check the user authorization of the user 162 requesting the upgrade process and log into the backend server 120 if the user is authorized to request the upgrade process. In one embodiment, each user 162 authorized to access the backend server 120 may have a user-specific memory space assigned on the backend server 120. A user 162 may use the user-specific memory space to store files related to the RU upgrade process. For example, the user-specific memory space assigned to the user 162 may store a user-specific directory 126 that the user 162 may use to store files related to the RU upgrade process.

After logging into the backend server 120, wrapper script 148 copies the input files 134 from the jump server 140 to the user-specific directory 126 on the backend server 120, wherein the user-specific directory 126 belongs to the user 162 that requested the RU upgrade process. Additionally, wrapper script 148 may copy a RU upgrade script 124 (shown as RU upgrade script copy 136) from a shared location on the backend server 120 to the user-specific directory 126.

The RU upgrade script 124 may be stored in a shared memory location in a memory storage associated with the backend server 120. For example, the RU upgrade script 124 may be provided by the user 162 and/or any other operator via a user device 160. The RU upgrade script 124 is a software program that runs one or more RU upgrade commands or procedures in relation to the RUs 106 identified in the input files 134. Each upgrade command or procedure may perform a different operation related to upgrading the RUs 106, such as pre-upgrade RU status check, RU band check, version of a software instruction on the RU, RU upgrade status, and post-upgrade RU status. These operations are described in conjunction with the output log file 138 (see FIG. 4B).

The RU upgrade script 124 stored at the shared location on the backend server 120 may be a master copy of the RU upgrade script 124 that can only be updated by authorized users 162. Updates can be made to the master copy of the RU upgrade script 124 only by users 162 authorized to update the RU upgrade script 124. Every time a user 162 requests to run an RU upgrade process in relation to one or more RUs 106, the wrapper script 148 copies the master copy of the RU upgrade script 124 (e.g., a read-only copy) into a user-specific directory 126 and executes the RU upgrade script copy 136 to perform the requested upgrade process. This helps ensure that the most recent and updated version of the RU upgrade script 124 is used for every upgrade process.

After the input files 134 and the RU upgrade script copy 136 have been copied to the user-specific directory 126 on the backend server 120, wrapper script 148 initiates the execution of RU upgrade script copy 136 at the backend server 120. The execution of the RU upgrade script copy 136 causes the backend server 120 to run a set of RU upgrade procedures on the one or more RUs 106 identified in the input files 134. For example, the RU upgrade script copy 136 may read identities of the one or more RUs 106 from the input files 134 and may run the upgrade procedures on the identified one or more RUs 106. RU upgrade script copy 136 may cause the backend server 120 to generate an output log file 138 that includes the results of running the set of upgrade procedures on the one or more RUs 106. The RU upgrade script copy 136 may then cause the backend server 120 to store the generated output log file 138 in the user-specific directory 126 of the requesting user 162.

Referring to FIG. 4B, an example output log file 138 is illustrated in a table format. Each row in the table refers to an upgrade process of a different RU 106. As shown in FIG. 4B, the table includes columns for statues at different stages of the RU upgrade process. For example, columns from the input file 134 may be included in the output log file 138. In the example output log file 138, other columns may include "Is reachable," "RU radio frequency band," "pre-upgrade software instruction version," "memory partition switch," "RU upgrade status," "post-upgrade software instruction version," and active memory partition."

In the "Is reachable" column, it is indicated if a respective RU 106 in each row is reachable or not. For example, the backend server 120 and/or the jump server 140 (e.g., via the RU upgrade script copy 136) may determine if the RU 106 is responsive, e.g., in signal communication with a respective CU 110 and/or DU 108 and/or other components at the respective cell site 102 and/or the backend server 120. For example, the RU 106 may be communicated an acknowledgment message by one or more the above-identified entities. If the RU 106 responds to the acknowledgment message, it may be determined that the RU 106 is reachable. In response, an indication that the RU 106 is reachable is added to the respective cell in the respective row of the table. Otherwise, an indication that the RU 106 is not reachable may be added.

In the "RU radio frequency band" column, an operating radio frequency band of a respective RU 106 in each row is indicated, e.g., tri-band, dual-band, etc. For example, the backend server 120 and/or the jump server 140 (e.g., via the RU upgrade script copy 136) may access and determine this information about the RU 106 after connecting with the RU 106 and accessing the configuration information associated with the RU 106.

In the "pre-upgrade software instruction version" column, a current version of a software instruction that is installed on an RU 106 before the upgrade process is indicated. The software instruction may be configured to perform one or more operations of the RU 106 when executed on a processor at the RU 106. If a target software instruction version is not compatible or applicable to a RU radio frequency band, the upgrade may be skipped for that RU 106, and indicated in this column, similar to that illustrated in the example of FIG. 2B.

In the "memory partition switch" column, it is indicated if a memory partition configuration switch is needed and/or performed. In the "RU upgrade status" column, it is indicated if the upgrade process for a RU 106 is successful and/or the RU 106 is rebooted. In the "post-upgrade software instruction version" column, it is indicated that the new version of the software instruction installed at the RU 106 after the upgrade. In the "active memory partition" column, an identifier (e.g., a number) of the memory partition on which the target software instruction version is installed is indicated.

Referring back to FIG. 1, once the execution of the RU upgrade script copy 136 is completed by the backend server 120 and/or the jump server 140, and the output log file 138 has been generated and stored in the user-specific directory 126, the wrapper script 148 running at the jump server 140 takes over and copies the output log file 138 to the jump server 140. After copying the output log file 138 to the jump server 140, the wrapper script 148 deletes the input files 134, RU upgrade script copy 136, and output log file 138 from the user-specific directory 126. As several users 162 may run the RU upgrade procedure and may store files related to the upgrade process in respective user-specific directories of the users on the backend server 120, continuing to store files related to running the upgrade process after the upgrade processes are completed may unnecessarily occupy memory at the backend server 120. Deleting files related to the upgrade after the upgrade process is completed, clears up memory space at the backend server 120. Additionally, as described above, when a RU upgrade procedure is requested by a user 162, the wrapper script 148 copies the most recent version of the RU upgrade script 124 from the shared location at the backend server 120 to the user-specific directory 126. Thus, there is no need to store a previous version of the RU upgrade script (e.g., RU upgrade script copy 136) after the requested upgrade procedure has been completed.

Once the output log file 138 has been copied to the jump server 140, the user 162 may copy the output log file 138 from the jump server 140 to the user device 160 of the user 162. Thereafter, the user 162 may delete the input files 134 and wrapper script 148 from the jump server 140. This helps clean up memory space on the jump server 140 for use by other operations performed by the jump server 140. In one embodiment, after the output log file 138 has been copied to the jump server 140, the jump server 140 may transmit the output log file 138 to the user device 160 and then delete the output log file 138 and the input files 134 from the jump server 140 to clear up memory space at the jump server 140. In one embodiment, the output log file 138 may be generated in a comma-separated values (CSV) file format.

In certain embodiments, the upgrade procedures may be run simultaneously on one or more RUs 106. Thus, multiple RUs 106 may be upgraded at the same time or substantially simultaneously within a threshold period.

Deploying the RU Upgrade Script

In certain embodiments, the jump server 140 may receive the input file 134 and the wrapper script 148, e.g., from the user 162 or the cloud server 150 via the network 170. The wrapper script 148 may include instructions related to deploying the RU upgrade script 124. The jump server 140 may also receive a command 154 that indicates to upgrade a set of RUs 106 identified in the input file 134. The command 154 may also include a target software instruction version and applicable RU radio frequency band information that are applicable and compatible with the target software instruction version. In response, the jump server 140 may execute the wrapper script 148 that causes the jump server 140 to login to the backend server 120 using the credentials of the user 162.

The jump server 140 and/or the backend server 120 may copy the input files 134 into the user-specific directory 126 that is associated with the user 162. The jump server 140 and/or the backend server 120 may copy the RU upgrade script 124 from the shared memory location at the backend server 120 into the user-specific directory 126 specified by the user 162 in the command 154. In other words, the jump server 140 and/or the backend server 120 may copy the latest version of the RU upgrade script 124 (e.g., the RU upgrade script copy 136) in the user-specific directory 126. The RU upgrade script 124 may be stored in the shared memory location at the backend server 120 by an authorized user 162. The RU upgrade script 124 may include software instructions associated with upgrading the set of RUs 106 identified in the input file 134.

Executing the RU Upgrade Script

The jump server 140 and/or the backend server 120 may execute or initiate the execution of the RU upgrade script copy 136 from the user-specific directory 126 by the processor of the backend server 120. This process causes the backend server 120 to start the upgrade process of the set of RUs 106.

The backend server 120 may perform a series of pre-upgrade status checks for the RUs 106. For example, the backend server 120 may determine whether the target software instruction version 116 is compatible or applicable to a RU radio frequency band associated with each RU 106 from the identified RUs 106 in the input file 134. In one example, the target software instruction version 116 and the applicable radio frequency band information 118 may be provided as command line arguments when executing the RU upgrade script copy 136. In the same or another example, the target software instruction version 116 and applicable radio frequency band information 118 may be provided in the command 154. If it is determined that the target software instruction version 116 is not applicable to the radio frequency band associated with a first RU 106, the upgrade process of the first RU 106 may be skipped. For example, this information may be included in the output log file 138, e.g., the fourth row in the example of FIG. 4B. However, if it is determined that the target software instruction version 116 is not applicable to the radio frequency band associated with a RU 106, the backend server 120 may determine whether the target software instruction version is already present on the active memory partition 114a associated with the RU 106.

Each RU 106 may include or be associated with an active memory storage (virtual) partition 114a and a passive memory storage (virtual) partition 114b. The active memory partition 114a may be used for data transmission over network 170 and/or other functions of the RU 106. The passive memory partition 114b may not be in use for data transmission over network 170 and/or other functions of the RU 106. If it is determined that the target software instruction version 116 is already present on the active memory partition 114a associated with the RU 106, the upgrade process of the RU 106 is not needed, such as the second row in the example FIG. 4B, where the pre-upgrade software instruction version 116 is the same as the target software instruction version 116.

If it is determined that the target software instruction version 116 is not present on the active memory partition 114a associated with the RU 106, the backend server 120 may determine whether the target software instruction version 116 is present on the passive memory partition 114b associated with the RU 106. If it is determined that the target software instruction version 116 is present on the passive memory partition 114b associated with the RU 106, the backend server 120 (e.g., via the RU upgrade script copy 136) may switch a configuration of the active memory partition 114a from active to passive. In other words, the mode of the active memory partition 114a may be changed to passive, and the mode of the passive memory partition 114b may be changed to active. This is because the target memory partition 114a is used in conjunction with performing the operations of the RU 106, and the passive memory partition 114b is not in use for the functions of the RU 106. Therefore, it is desired to run or implement the target software instruction version 116 on the active memory partition 114a.

After the configuration of the passive memory partitions 114b is switched to active, the RU 106 is rebooted, e.g., in response to a command from the RU upgrade script copy 136. After the reboot, the RU 106 may be running the target software instruction version 116 on the active memory partition 114a. This information may be included in the output log file 138, such as the first row in FIG. 4B.

On the other hand, if it is determined that the target software instruction version 116 is not present on the passive memory partition 114b, the backend server 120 may determine whether a memory partition (configuration) switch is needed. In other words, it is determined whether switching the configurations of the active and passive memory partitions 114a and 114b is needed. If it is determined that switching the configurations of the active and passive memory partitions 114a and 114b is needed, the configuration of the active memory partition 114a may be switched to passive, and the configuration of the passive memory partition 114b is switched to active. The backend server 120 may reboot the RU 106, e.g., in response to a command from the RU upgrade script copy 136.

After the reboot, the backend server 120 may identify files associated with a previous version of the software instruction 116. The backend server 120 may delete the identified files. The backend server 120 may download target software instruction version 116 on the RU 106. The backend server 120 may execute the target software instruction version 116 on the RU 106. The backend server 120 may reboot the RU 106. After the second reboot, the RU 106 may be running the target software instruction version 116 on the active memory partition 114a. This information may be included in the output log file 138, such as the first row in FIG. 4B.

If it is determined that the memory partition switch is not needed, the backend server 120 may identify files associated with a previous version of the software instruction 116. The backend server 120 may delete the identified files. The backend server 120 may download target software instruction version 116 on the RU 106. The backend server 120 may execute the target software instruction version 116 on the RU 106. The backend server 120 may reboot the RU 106. After the reboot, the RU 106 may be running the target software instruction version 116 on the active memory partition 114a. This information may be included in the output log file 138.

In certain embodiments, it may be determined that the memory partition switch is needed if the target software instruction version 116 is installed on the passive memory partition 114b. This is because if the target software instruction version 116 is installed on the active memory partition 114a, the operations of the RU 106 may be interrupted. Thus, it is desired to have the target software instruction version 116 to be installed on the passive memory partition 114b and then switch the configuration of the passive memory partition 114b from passive to active.

In certain embodiments, it may be determined that the memory partition switch is needed if a previous software instruction version is installed on the active memory partition 114a. In this case, the target software instruction version 116 may be installed on the passive memory partition 114b. Then, the configuration of the passive memory partition 114b may be switched to active. The previous version of the software instruction may be deleted.

In certain embodiments, it may be determined that the memory partition switch is not needed if the active memory partition 114a is the memory partition "0" and the passive memory partition 114b is the memory partition "1". For example, if a first memory storage partition (e.g., memory partition "0") is the active memory partition 114a and is in use for data communication over network 170, and a second memory storage partition (e.g., memory partition "1") is the passive memory partition 114b and is not in use for data communication, it may be determined that the memory partition switching is not needed.

In certain embodiments, it may be determined that the memory partition switch is needed if the active memory partition 114a is the memory partition "1" and the passive memory partition 114b is the memory partition "0". For example, if a first memory storage partition (e.g., memory partition "1") is the active memory partition 114a and is in use for data communication over network 170, and a second memory storage partition (e.g., memory partition "0") is the passive memory partition 114b and is not in use for data communication, it may be determined that the memory partition switching is needed.

User Case Where a Target Software Instruction Version Failed to be Installed

In certain embodiments, the backend server 120 may determine if the target software instruction version 116 failed to be installed on the RU 106, e.g., on the passive memory partition 114b. In response to determining that the target software instruction version 116 has failed to be installed on the RU 106, the backend server 120 may determine one or more operations where the target software instruction version 116 failed to be installed. For example, the one or more operations may include executing one or more commands in the RU upgrade script copy 136, downloading the target software instruction version 116, unzipping a downloaded file, installing the target software instruction version 116, etc.

The backend server 120 may determine a reason for a failure in installing the target software instruction version 116 by evaluating each of the one or more operations. The backend server 120 may receive an updated version of the one or more operations (e.g., updated commands, etc.) from a user 162 via the user device 160 and network 170. For example, the user 162 may debug the one or more operations that led to the failure in the installation process of the target software instruction version 116, and provide the updated operations, instructions, or commands to the backend server 120, e.g., in a form of updated RU upgrade script. The updated operations or updated commands may address (or resolve) the reason for the failure in installing the target software instruction version 116. The backend server 120 may execute the updated one or more operations, e.g., included in the updated RU upgrade script.

In certain embodiments, the backend server 120 may determine whether the reason for the failed installation of the target software instruction version 116 is hardware or software related. If it is determined that the reason for the failed installation of the target software instruction version 116 is hardware-related, the backend server 120 may communicate a message indicating the hardware-related reason for the failed installation of the target software instruction version 116, e.g., loose wires, a hardware malfunction of a processor, a memory, etc., to one or more entities, such as user device 160, a vendor who provided the RU 106, etc. If it is determined that the reason for the failed installation of the target software instruction version 116 is software related, the backend server 120 may communicate a message indicating the software-related reason for the failed installation of the target software instruction version 116, e.g., out of date software module, etc. to one or more entities, such as user device 160, a vendor who provided the RU 106, etc.

The backend server 120 may receive an indication that the execution of the RU upgrade script copy 136 has been completed. The backend server 120 may generate the output log file 138 that indicates the results of executing the target software instruction version 116 in each RU 106 and the upgrade process for each RU 106. The backend server 120 may copy the output log file 138 from the user-specific directory 126 to a memory of the jump server 140. The backend server 120 may delete the input file 134, the RU upgrade script copy 136, and the output log file 138 from the user-specific directory 126.

Method for RU Upgrade Procedure

Figure 5:
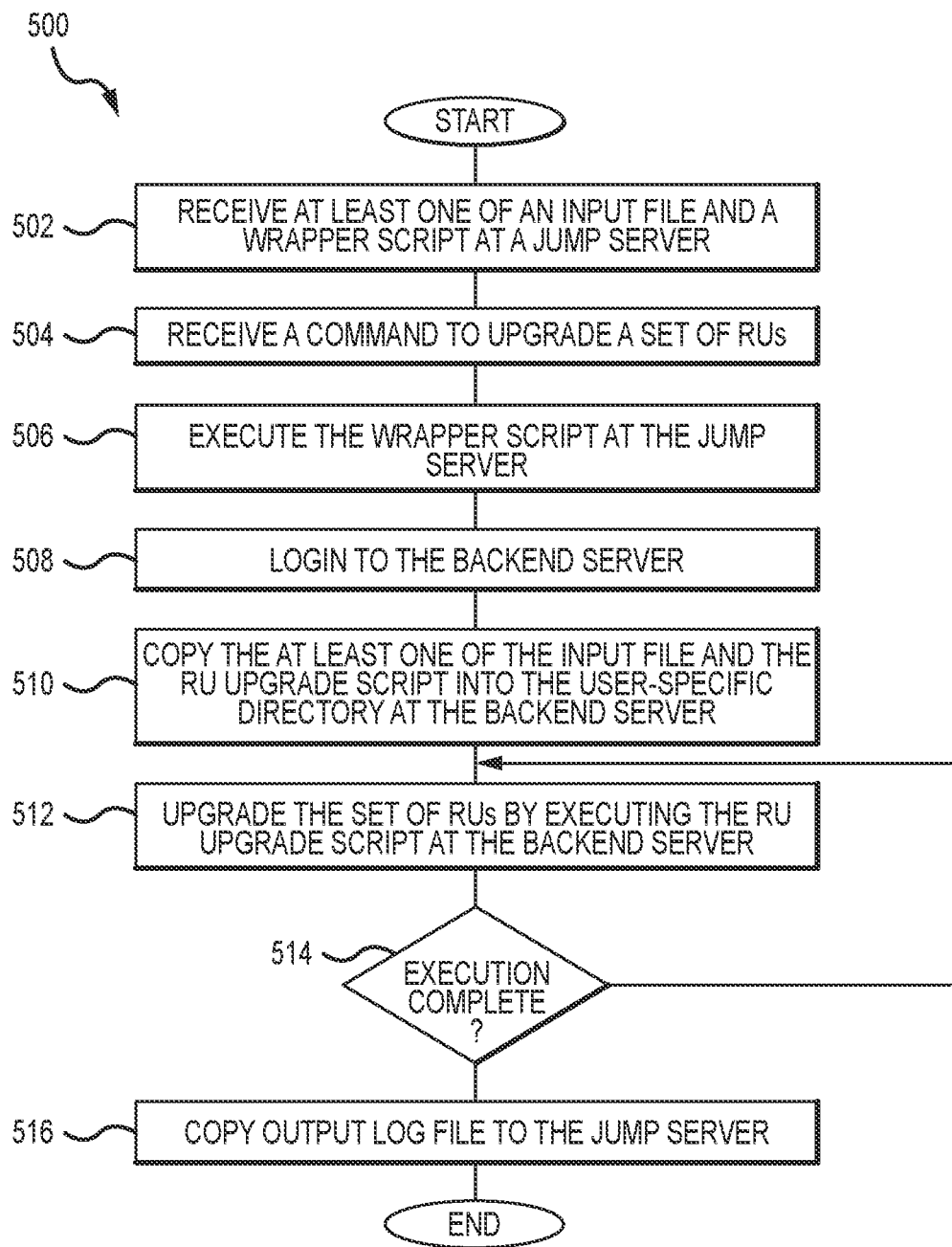
FIG. 5 illustrates an example flowchart of a method for upgrading RUs.

FIG. 5 illustrates an example flowchart of a method 500 for the RU upgrade procedure according to certain embodiments of the present disclosure. Modifications, additions, or omissions may be made to method 500. Method 500 may include more, fewer, or other operations. For example, operations may be performed in parallel or in any suitable order. While at times discussed as the system 100, jump server 140, backend server 120, or components of any of thereof performing operations, any suitable system or components of the system may perform one or more operations of the method 500. For example, one or more operations of method 500 may be implemented, at least in part, in the form of software instructions (e.g., wrapper script 148, RU upgrade script 124, RU upgrade script copy 136, etc.), stored on non-transitory, tangible, machine-readable media (e.g., memory 606 and 706 of FIGS. 6 and 7, respectively) that when run by one or more processors (e.g., processor 602 and 702 of FIGS. 6 and 7, respectively) may cause the one or more processors to perform operations 502-516.

At operation 502, the jump server 140 receives at least one an input file 134 and the wrapper script 148. For example, the jump server 140 may receive the input file 134 and/or the wrapper script 148 from the user device 160 and/or the cloud server 150, similar to that described in FIGS. 1-2. The input file 134 may include a list of a set of RUs 106 that are desired to be upgraded, among other information, similar to that described in FIGS. 1 and 4.

At operation 504, the jump server 140 receives a command 154 to upgrade the set of RUs 106. For example, the jump server 140 may receive the command 154 from the user device 160, similar to that described in FIG. 1.

At operation 506, the jump server 140 executes the wrapper script 148. At operation 508, the jump server 140 logs into the backend server 120. For example, the jump server 140 may use the user credentials associated with the 162 to log into the backend server 120, similar to that described in FIG. 1.

At operation 510, the jump server 140 copies at least one of the input file 134 and the wrapper script 148 into the user-specific directory 126 at the backend server 120. At operation 512, the jump server 140 and/or the backend server 120 upgrades the set of RUs 106 by executing the RU upgrade script copy 136 at the backend server 120.

At operation 514, the jump server 140 and/or the backend server 120 determine whether the execution of the RU upgrade script copy 136 is completed. In this process, the jump server 140 and/or the backend server 120 may determine whether each RU 106 indicated in the input file 134 is restarted. In other words, the jump server 140 and/or the backend server 120 may determine whether each RU upgrade process failed or succussed. If it is determined that the execution of the RU upgrade script copy 136 is completed, method 500 proceeds to operation 514. Otherwise, method 500 may return to operation 512. In certain embodiments, if it is determined that the execution of the RU upgrade script copy 136 is not completed, method 500 may wait until all the RUs 106 (indicated in the input file 134) are upgraded or at least an indication of a failed RU upgrade is detected and/or added to the output log file 138. At the end of this operation, the output log file 138 is generated and populated with the RU upgrade procedure.

At operation 516, the backend server 120 copies the output log file 138 to the jump server 140. Once the output log file 138 has been copied to the jump server 140, the user 162 may copy the output log file 138 from the jump server 140 to the user device 160 of the user 162. Thereafter, the user 162 may delete the input files 134 and wrapper script 148 from the jump server 140. This helps clean up memory space on the jump server 140 for use by other operations performed by the jump server 140.

Example Jump Server

Figure 6:
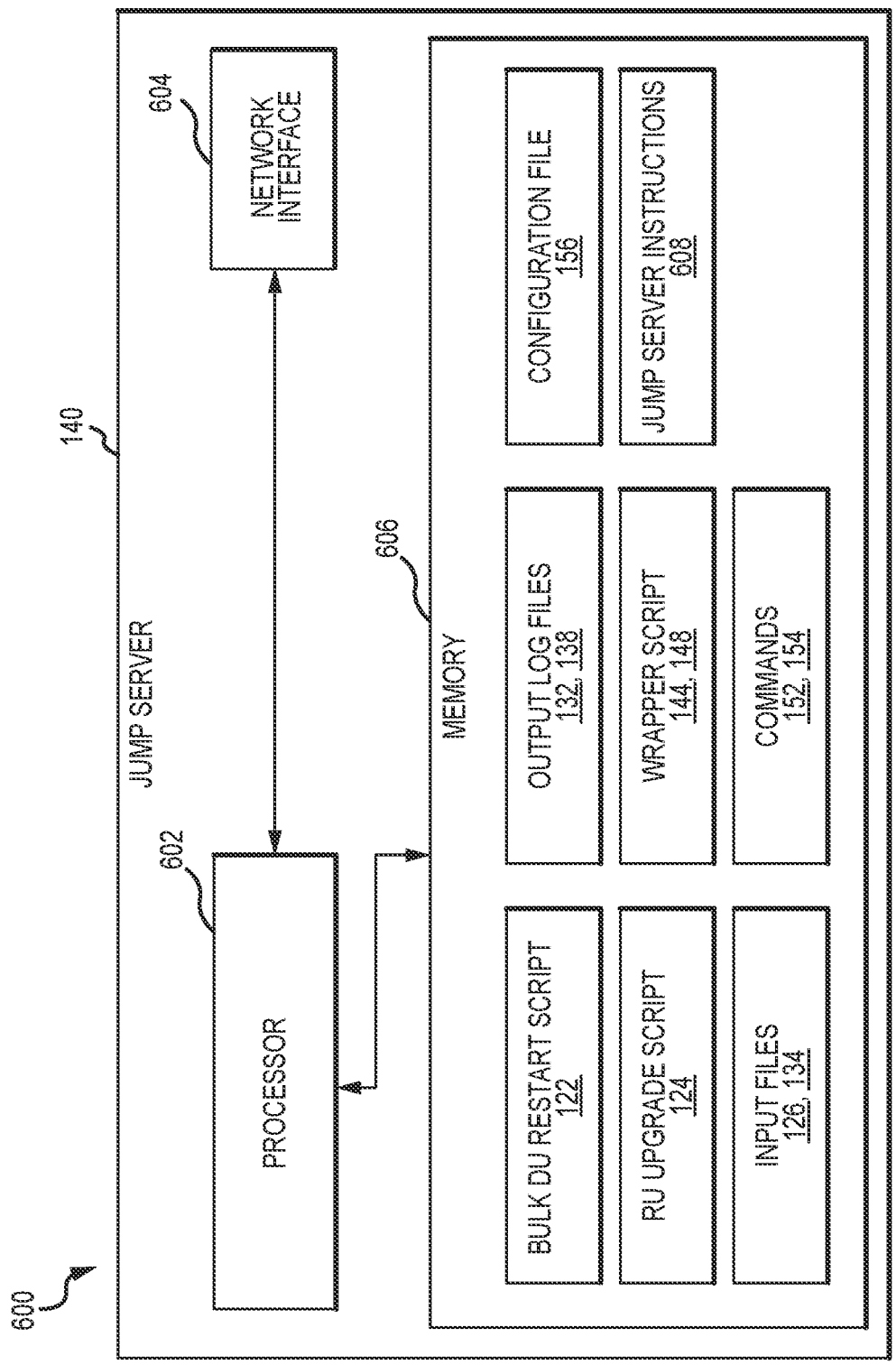
FIG. 6 illustrates an example schematic diagram of the jump server illustrated in FIG. 1, in accordance with one or more embodiments of the present disclosure.

FIG. 6 illustrates an example schematic diagram 600 of the jump server 140 illustrated in FIG. 1, in accordance with one or more embodiments of the present disclosure. Jump server 140 includes a processor 602, a memory 606, and a network interface 604. The components of the jump server 140 are communicatively coupled with each other. The jump server 140 may be configured as shown in FIG. 6 or in any other suitable configuration.

The processor 602 comprises one or more processors operably coupled to the memory 606 and the network interface 604. The processor 602 is any electronic circuitry including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 602 may be a programmable logic device, a microcontroller, a microprocessor, or any suitable combination of the preceding. The processor 602 is communicatively coupled to and in signal communication with the memory 606. The one or more processors are configured to process data and may be implemented in hardware or software. For example, the processor 602 may be 8-bit, 16-bit, 32-bit, 64-bit or of any other suitable architecture. The processor 602 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., jump server instructions 608, wrapper scripts 144, 148, etc.) to implement one or more operations of the jump server 140. In this way, processor 602 may be a special-purpose computer designed to implement the functions disclosed herein. In one or more embodiments, the jump server 140 is implemented using logic units, FPGAs, ASICs, DSPs, or any other suitable hardware. The jump server 140 is configured to operate as described with reference to FIGS. 1-5. For example, the processor 602 may be configured to perform at least a portion of one or more operational flows of the system 100 as described in FIGS. 1, 2, and 4, at least a portion of the method 300 as described in FIG. 3, and at least a portion of the method 500 as described in FIG. 5.

The network interface 604 is configured to enable wired and/or wireless communications. The network interface 604 is configured to communicate data between the jump server 140 and other devices, systems, or domains (e.g., backend server 120, user devices 160, cell sites 102, etc.). For example, the network interface 604 may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 602 may be configured to send and receive data using the network interface 604. The network interface 604 may be configured to use any suitable type of communication protocol.

The memory 606 may be volatile or non-volatile and may comprise read-only memory (ROM), random-access memory (RAM), ternary content-addressable memory (TCAM), dynamic random-access memory (DRAM), and static random-access memory (SRAM). The memory 606 may include one or more of a local database, a cloud database, a network-attached storage (NAS), etc. The memory 606 comprises one or more disks, tape drives, or solid-state drives, and may be used as an over-flow data storage device, to store programs when such programs are selected for execution, and to store instructions and data that are read during program execution. The memory 606 may store any of the information described in FIGS. 1-7 along with any other data, instructions, logic, rules, or code operable to implement the function(s) described herein when executed by processor 602. For example, the memory 606 may store input files 128, 134, wrapper scripts 144, 148, output log files 132, 138, RU upgrade script 124, bulk DU restart script 122, commands 152, 154, configuration file 156, jump server instructions 608, and/or any other data or instructions. The jump server instructions 608 may include any suitable set of instructions, logic, rules, or code operable to execute the processor 602 and perform the functions of the jump server 140 described herein, such as some or all of those described in FIGS. 1-5. In one embodiment, the jump server instructions 608 include the wrapper scripts 144 and 148.

Example Backend Server

Figure 7:
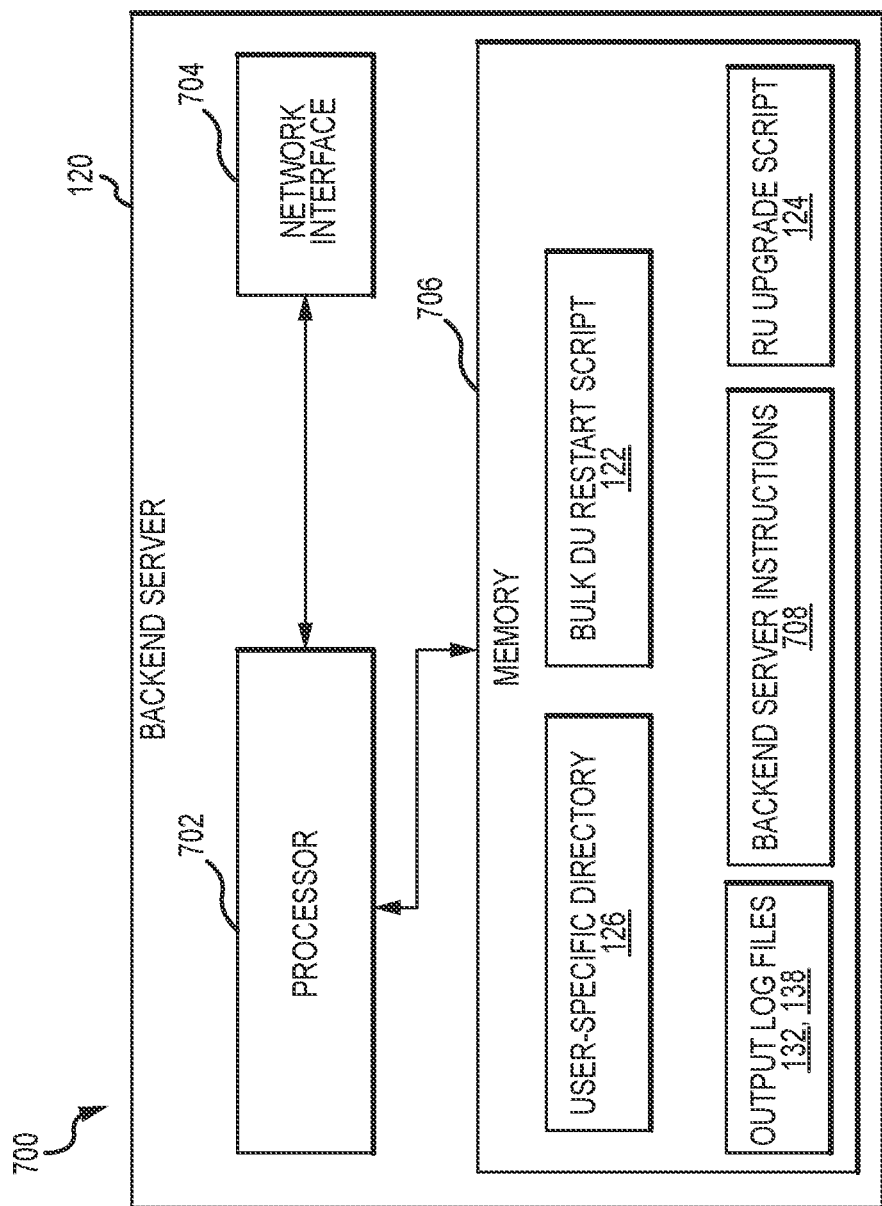
FIG. 7 illustrates an example schematic diagram of the performance server illustrated in FIG. 1, in accordance with one or more embodiments of the present disclosure.

FIG. 7 illustrates an example schematic diagram 700 of the backend server 120 illustrated in FIG. 1, in accordance with one or more embodiments of the present disclosure. Backend server 120 includes a processor 702, a memory 706, and a network interface 704. The components of the backend server 120 are communicatively coupled with each other. The backend server 120 may be configured as shown in FIG. 7 or in any other suitable configuration.

The processor 702 comprises one or more processors operably coupled to the memory 706 and the network interface 704. The processor 702 is any electronic circuitry including, but not limited to, state machines, one or more CPU chips, logic units, cores (e.g. a multi-core processor), FPGAs, ASICs, or DSPs. The processor 702 may be a programmable logic device, a microcontroller, a microprocessor, or any suitable combination of the preceding. The processor 702 is communicatively coupled to and in signal communication with the memory 706. The one or more processors are configured to process data and may be implemented in hardware or software. For example, the processor 702 may be 8-bit, 16-bit, 32-bit, 64-bit or of any other suitable architecture. The processor 702 may include an ALU for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., backend server instructions 708, bulk DU restart script 122, RU upgrade script 124, etc.) to implement one or more operations of the backend server 120. In this way, processor 702 may be a special-purpose computer designed to implement the functions disclosed herein. In one or more embodiments, the backend server 120 is implemented using logic units, FPGAs, ASICs, DSPs, or any other suitable hardware. The backend server 120 is configured to operate as described with reference to FIGS. 1-5. For example, the processor 702 may be configured to perform at least a portion of one or more operational flows of the system 100 as described in FIGS. 1, 2, and 4, at least a portion of the method 300 as described in FIG. 3, and at least a portion of the method 500 as described in FIG. 5.

The network interface 704 is configured to enable wired and/or wireless communications. The network interface 704 is configured to communicate data between the backend server 120 and other devices, systems, or domains (e.g., jump server 140, user devices 160, cell sites 102, etc.). For example, the network interface 704 may comprise an NFC interface, a Bluetooth interface, a Zigbee interface, a Z-wave interface, an RFID interface, a WIFI interface, a LAN interface, a WAN interface, a MAN interface, a PAN interface, a WPAN interface, a modem, a switch, and/or a router. The processor 702 may be configured to send and receive data using the network interface 704. The network interface 704 may be configured to use any suitable type of communication protocol.

The memory 706 may be volatile or non-volatile and may comprise read-only memory (ROM), RAM, TCAM, DRAM, and SRAM. The memory 706 may include one or more of a local database, a cloud database, a NAS, etc. The memory 706 comprises one or more disks, tape drives, or solid-state drives, and may be used as an over-flow data storage device, to store programs when such programs are selected for execution, and to store instructions and data that are read during program execution. The memory 706 may store any of the information described in FIGS. 1-7 along with any other data, instructions, logic, rules, or code operable to implement the function(s) described herein when executed by processor 702. For example, the memory 706 may store bulk DU restart script 122, RU upgrade script 124, output log files 132, 138, backend server instructions 708, and/or any other data or instructions. The memory 706 may store the latest version of the bulk DU restart script 122 and the latest version of the RU upgrade script 124 in the user-specific directory 126. The user-specific directory 126 may be a portion of the memory 706.

The backend server instructions 708 may include any suitable set of instructions, logic, rules, or code operable to execute the processor 702 and perform the functions of the backend server 120 described herein, such as some or all of those described in FIGS. 1-5. It may be noted that each user device 160, may be implemented similar to the jump server 140 or the backend server 120. For example, a user device 160 may include a processor and a memory storing instructions to implement the respective functionality of the user device 160 when executed by the processor.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for restarting Distributed Units (DUs) comprising:
   a plurality of cell sites, wherein each of the plurality of cell sites comprises at least one Distributed Unit (DU) and a plurality of Control Units (CUs) communicatively coupled to the at least one DU;
   a first server comprising a first processor and communicatively coupled to the plurality of cell sites; and
   a second server communicatively coupled to the first server, wherein the second server comprises a second processor configured to:
      receive an input file and a wrapper script, wherein:
         the input file comprises a set of identifiers associated with a set of DUs;
         the wrapper script comprises instructions related to deploying a DU restart script;
      receive a command indicating to restart the set of DUs;
      in response to receiving the command, execute the wrapper script causing the second processor to:
         login to the first server using credentials of a user;

copy the input file into a user-specific directory associated with the user at the first server;
copy the DU restart script from a shared memory location within the first server into the user-specific directory, wherein the DU restart script comprises instructions associated with restarting the set of DUs;
initiate an execution of the DU restart script by the first processor, causing the first processor to:
determine that a first connection between a first DU from among the set of DUs and a CU is not established;
in response to determining that the first connection between the first DU and the CU is not established, trigger restarting the first DU; and
generate an output file that comprises results of restarting the first DU.

2. The system of claim 1, wherein executing the DU restart script further causes the first processor to:
determine that a second connection between a second DU from among the set of DUs and the CU is established;
receive an input DU configuration file associated with the second DU;
in response to receiving the input DU configuration file, determine that the second DU needs to be reconfigured according to the input DU configuration file;
trigger restarting the second DU; and
include results of restarting the second DU in the output file.

3. The system of claim 1, wherein the results of restarting the first DU indicate that the first DU is connected to the CU.

4. The system of claim 2, wherein the results of restarting the second DU indicate that the second DU is connected to the CU.

5. The system of claim 1, wherein the results of restarting the first DU indicate that the first DU is scrolling Physical Random-Access Channels (PRACHs) according to a preconfigured PRACH scrolling value.

6. The system of claim 2, wherein the results of restarting the second DU indicate that the second DU is scrolling Physical Random-Access Channels (PRACHs) according to a preconfigured PRACH scrolling value.

7. The system of claim 1, wherein executing the DU restart script further causes the first processor to:
determine that a first service associated with the first DU has failed to restart after restarting the first DU;
include a first indication that the first service has failed to restart in the output file;
determine that a second service associated with the first DU has successfully restarted after restarting the first DU; and
include a second indication that the second service has successfully restarted in the output file.

8. A method for restarting Distributed Units (DUs) comprising:
receiving, at a second server, an input file and a wrapper script, wherein:
the input file comprises a set of identifiers associated with a set of Distributed Units (DUs);
the wrapper script comprises instructions related to deploying a DU restart script;
receiving, at the second server, a command indicating to restart the set of DUs;
in response to receiving the command, executing, at the second server, the wrapper script causing the second server to:
log into a first server using credentials of a user;
copy the input file into a user-specific directory associated with the user at the first server;
copy the DU restart script from a shared memory location within the first server into the user-specific directory, wherein the DU restart script comprises instructions associated with restarting the set of DUs;
initiate an execution of the DU restart script by the first server, causing the first server to:
determine that a first connection between a first DU from among the set of DUs and a Control Unit (CU) is not established;
in response to determining that the first connection between the first DU and the CU is not established, trigger restarting the first DU; and
generate an output file that comprises results of restarting the first DU.

9. The method of claim 8, wherein executing the DU restart script further causes the first server to:
determining that a second connection between a second DU from among the set of DUs and the CU is established;
receiving an input DU configuration file associated with the second DU;
in response to receiving the input DU configuration file, determining that the second DU needs to be reconfigured according to the input DU configuration file;
triggering restarting the second DU; and
including results of restarting the second DU in the output file.

10. The method of claim 8, wherein the results of restarting the first DU indicate that the first DU is connected to the CU.

11. The method of claim 9, wherein the results of restarting the second DU indicate that the second DU is connected to the CU.

12. The method of claim 8, wherein the results of restarting the first DU indicate that the first DU is scrolling Physical Random-Access Channels (PRACHs) according to a preconfigured PRACH scrolling value.

13. The method of claim 9, wherein the results of restarting the second DU indicate that the second DU is scrolling Physical Random-Access Channels (PRACHs) according to a preconfigured PRACH scrolling value.

14. The method of claim 8, wherein executing the DU restart script further causes the first server to:
determine that a first service associated with the first DU has failed to restart after restarting the first DU;
include a first indication that the first service has failed to restart in the output file;
determine that a second service associated with the first DU has successfully restarted after restarting the first DU; and
include a second indication that the second service has successfully restarted in the output file.

15. A non-transitory computer-readable medium storing instructions that when executed by one or more processors, cause the one or more processors to:
receive, at a second server, an input file and a wrapper script, wherein:
the input file comprises a set of identifiers associated with a set of Distributed Units (DUs);
the wrapper script comprises instructions related to deploying a DU restart script;
receive, at the second server, a command indicating to restart the set of DUs;

in response to receiving the command, execute, at the second server, the wrapper script causing the second server to:
log into a first server using credentials of a user;
copy the input file into a user-specific directory associated with the user at the first server;
copy the DU restart script from a shared memory location within the first server into the user-specific directory, wherein the DU restart script comprises instructions associated with restarting the set of DUs;
initiate an execution of the DU restart script by the first server, causing the first server to:
determine that a first connection between a first DU from among the set of DUs and a Control Unit (CU) is not established;
in response to determining that the first connection between the first DU and the CU is not established, trigger restarting the first DU; and
generate an output file that comprises results of restarting the first DU.

16. The non-transitory computer-readable medium of claim 15, wherein executing the DU restart script further causes the first server to:
determine that a second connection between a second DU from among the set of DUs and the CU is established;
receive an input DU configuration file associated with the second DU;
in response to receiving the input DU configuration file, determine that the second DU needs to be reconfigured according to the input DU configuration file;
trigger restarting the second DU; and
include results of restarting the second DU in the output file.

17. The non-transitory computer-readable medium of claim 15, wherein the results of restarting the first DU indicate that the first DU is connected to the CU.

18. The non-transitory computer-readable medium of claim 16, wherein the results of restarting the second DU indicate that the second DU is connected to the CU.

19. The non-transitory computer-readable medium of claim 15, wherein the results of restarting the first DU indicate that the first DU is scrolling Physical Random-Access Channels (PRACHs) according to a preconfigured PRACH scrolling value.

20. The non-transitory computer-readable medium of claim 16, wherein the results of restarting the second DU indicate that the second DU is scrolling Physical Random-Access Channels (PRACHs) according to a preconfigured PRACH scrolling value.

* * * * *